(No Model.)
P. A. CALAHART.
LINED PIPE.
No. 562,354.  Patented June 16, 1896.
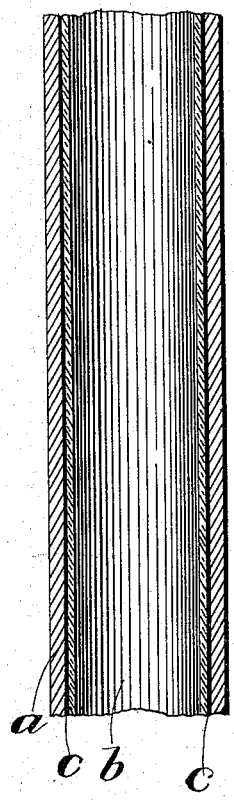
WITNESSES
Florence H. Davis
Charles B. Crocker.
INVENTOR
Philip A. Calahart
by R. Jahryes.
atty.

UNITED STATES PATENT OFFICE.

PHILIP A. CALAHART, OF WAKEFIELD, MASSACHUSETTS, ASSIGNOR TO THE NEW ENGLAND WATER PIPE COMPANY, OF SAME PLACE.

LINED PIPE.

SPECIFICATION forming part of Letters Patent No. 562,354, dated June 16, 1896.

Application filed May 28, 1894. Serial No. 512,616. (No model.)

*To all whom it may concern:*

Be it known that I, PHILIP A. CALAHART, of Wakefield, in the county of Middlesex and State of Massachusetts, have invented an Improvement in Lined Pipes, of which the following description, in connection with the accompanying drawing, is a specification, like letters on the drawing representing like parts.

In certain pipes, as well as fittings and unions connecting sections of the same together, an outer shell of iron or other material is provided interiorly with a lining of lead or other material, which is unaffected by the material flowing through the pipe. This interior coating or lining is expanded in the shell, the intention being that it will be held in place by being so expanded, but in practice it works loose, and more particularly when the pipe is subjected to certain changeable temperatures where the ratio of expansion between the shell and its lining is quite large.

This invention has for its object to improve the construction of such lined or interiorly-coated pipe; and it consists in interposing between the lining and shell an additional element which acts to hold the parts together flexibly, that is to say, the additional element which I interpose consists of an adhesive compound or material, which by its adhesive properties holds the parts together, although certain ingredients are introduced into the compound to prevent it from drying, so that while exercising its adhesive properties still permits the lining to work within the shell to compensate for the different ratios of expansion.

My flexible adhesive compound may be composed of glue and pitch, and, say, a small percentage of glycerin or some other equivalent material, yet my invention is not limited to any particular ingredients composing the flexible adhesive compound.

The drawing shows a longitudinal section of pipe with my flexible adhesive compound interposed between the lining and shell.

$a$ represents the shell, and $b$ the lining. The former may be made of iron, and the latter of lead.

$c$ represents a flexible adhesive compound or material interposed between the shell and its lining.

The adhesive compound may be introduced in any suitable way, the method of its introduction forming no part of my present invention. For instance, the lining may be placed within the shell, and the adhesive compound poured into one end between the parts while hot, and thereafter the lining may be slightly expanded. As the adhesive compound cools the parts will adhere together to a certain extent, sufficiently to prevent the lining from becoming absolutely detached from the shell, and owing to the flexibility of the compound employed the lining may work independent of the shell to a certain extent to compensate for the different ratios of expansion between the two metals.

As my invention is equally as well applicable to fittings and unions, they are therein included.

I am aware that plastic or elastic materials have been interposed between an external pipe and an inner tube or lining of glass, for the purpose of preventing the glass lining from being broken by the pipe being contracted or expanded by the action of the cold or heat, and also that an elastic cushion has been interposed between an external pipe of rigid material and a core-pipe of ductile material, to permit the core-pipe to expand when the liquid inside it freezes, and to cause the said core-pipe to contract when the liquid thaws; but such plastic or elastic materials serve only as cushions, and will not accomplish the results which I have obtained, namely, to cause the lining or core-pipe to flexibly adhere to the external pipe, permitting the pipes to expand and contract independently, at their respective ratios, and causing the lining as it contracts to resume its original position within the external pipe, thereby preventing it from working along within said external pipe, and becoming detached therefrom as it is subjected to repeated changes in temperature.

I claim—

As a new article of manufacture, a pipe, fitting, or union composed of the shell $a$, lining $b$, and an interposed layer of flexible adhesive compound.

In testimony whereof I have signed my name to this specification in the presence of two subscribing witnesses.

PHILIP A. CALAHART.

Witnesses:
OTIS F. WATERMAN,
FREDERIC S. HARTSHORNE.